United States Patent
Khosrowpour et al.

(10) Patent No.: US 11,435,808 B2
(45) Date of Patent: Sep. 6, 2022

(54) ADAPTIVE CPU POWER LIMIT TUNING

(71) Applicant: Dell Products L.P., Round Rock, TX (US)

(72) Inventors: Farzad Khosrowpour, Pflugerville, TX (US); Mitch Anthony Markow, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 92 days.

(21) Appl. No.: 17/023,103

(22) Filed: Sep. 16, 2020

(65) Prior Publication Data

US 2022/0083121 A1    Mar. 17, 2022

(51) Int. Cl.
*G06F 1/32* (2019.01)
*G06F 1/3234* (2019.01)
*G06N 20/00* (2019.01)
*G06F 1/3206* (2019.01)

(52) U.S. Cl.
CPC .......... *G06F 1/3234* (2013.01); *G06F 1/3206* (2013.01); *G06N 20/00* (2019.01)

(58) Field of Classification Search
CPC ....................................................... G06F 1/32
See application file for complete search history.

(56) References Cited

U.S. PATENT DOCUMENTS

| | | | |
|---|---|---|---|
| 2014/0236380 A1* | 8/2014 | Alton | G06F 1/206 700/299 |
| 2018/0232036 A1* | 8/2018 | Varadarajan | G06F 1/3209 |
| 2018/0356871 A1* | 12/2018 | Gutierrez-Vazquez | G06F 1/3228 |
| 2019/0129498 A1* | 5/2019 | Leung | G06F 1/206 |
| 2020/0064894 A1* | 2/2020 | Li | G06F 1/08 |

* cited by examiner

*Primary Examiner* — Paul B Yanchus, III
(74) *Attorney, Agent, or Firm* — Kirton McConkie; Brian Tucker (57) ABSTRACT

Adaptive CPU power limit tuning can be performed. A mode detector can employ a machine learning model to detect a mode of operation on a computing device. As the computing device operates in the various modes, a mode boundary tuner of the mode detector can evaluate performance measurements to determine whether the currently defined boundaries between the various modes are optimal for the particular computing device. When the mode boundary tuner determines that a more optimal boundary definition exists, it can dynamically change the boundary to thereby tune the mode selection process on the particular computing device. A power limit setter may also be employed to set the CPU's power limits based on the mode detected by the mode detector. As the computing device operates in a mode, a power limit tuner can evaluate performance measurements and adjust the power limits to thereby tune the mode-specific power limits to the workload that is currently being executed.

20 Claims, 7 Drawing Sheets

ADAPTIVE CPU POWER LIMIT TUNING

CROSS-REFERENCE TO RELATED APPLICATIONS

N/A

BACKGROUND

Modern CPUs typically employ various power limit settings to limit power consumption. A primary purpose of limiting the CPU's power consumption is to comply with the thermal design power (TDP). For example, Intel CPUs define a default or steady-state power limit called PL1 and an increased or "turbo boost" power limit called PL2, among other possible power limits. Such CPUs are typically designed to transition from PL1 to PL2 to handle a workload but will only remain at PL2 for a limited amount of time (referred to as Tau on Intel CPUs). In other words, when a workload is applied to the CPU while in the PL1 state, the CPU may transition to the PL2 state during which power consumption may temporarily increase up to PL2 (as opposed to being limited to PL1).

The power consumption of a CPU is largely based on the frequency at which it runs. Therefore, increasing the power limit of the CPU generally results in increased performance. To obtain maximum performance as often as possible (i.e., to maximize performance without overheating the system), CPU manufacturers have developed schemes for setting the power limits based on a detected mode of a computing device. In these schemes, the mode is typically selected based on a number of CPU workload or thermal parameters.

Figure 1:
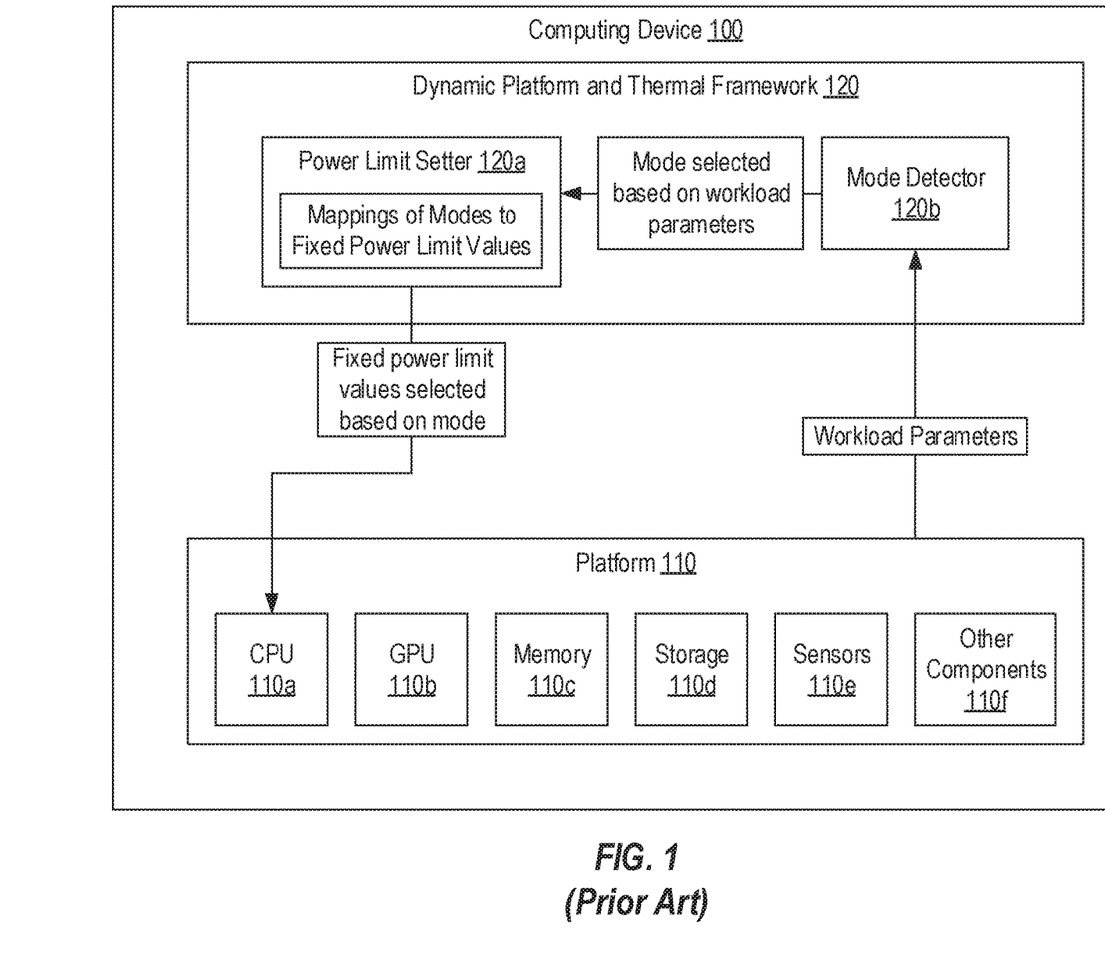
FIG. 1 illustrates an example of components that may be employed on a computing device to implement prior art techniques for setting a CPU's power limits.

For example, Intel provides the Dynamic Platform and Thermal Framework (DPTF) which is designed to set the values of PL1 and PL2 based on a detected mode of a computing device where the mode represents the workload the CPU is experiencing. FIG. 1 is intended to provide a generalized example of how the DPTF works. In FIG. 1, a computing device 100 is shown as including a platform 110 and the DPTF framework 120. Platform 110 is intended to generally represent the many different hardware components that may exist on computing device 100 such as, for example, a CPU 110a, a GPU 110b, memory 110c, storage 110d, sensors 110e and other components 110f. DPTF 120 is shown as including a power limit setter 120a and a mode detector 120b.

As shown, mode detector 120b can be configured to retrieve or otherwise receive various workload parameters and then selects a particular mode based on the workload parameters (e.g., from among a bursty mode, a sustained mode, a semi-active mode and an idle mode). Power limit setter 120a, which can maintain mappings of modes to fixed power limit values, can receive the currently detected mode from mode detector 120b and use it to select the power limit values that should be applied to CPU 110a. For example, if mode detector 120b determines that computing device 100 is in the idle mode, power limit setter 120a may cause CPU 110a to employ default values for the various power limits (e.g., 95 W for PL1 and 118.75 W for PL2). In contrast, if mode detector 120b determines that computing device 100 is in the bursty mode, power limit setter 120a may cause CPU 110a to employ higher values for the various power limits.

More recent schemes have integrated machine learning into the process of identifying a mode. In the context of FIG. 1, machine learning can be employed to more accurately select the particular mode based on the workload that the CPU is currently handling. However, even when mode detector 120b employs machine learning techniques to identify the current mode, power limit setter 120a will still apply the fixed power limits for the current mode.

Furthermore, these fixed power limits are typically set manually by the platform provider. For example, Intel provides a tool by which the platform provider such as Dell, HP, Lenovo, etc. may manually specify the values of PL1, PL2, etc. for each available mode that mode detector 120b may detect using its machine learning techniques. Such manual setting of the power limit values generally does not account for variations in platform 110. For example, the platform provider may oftentimes specify a set of power limit values for a particular product family but will not specify separate sets of power limit values for any of the multiple SKUs within the particular product family. Accordingly, the set of power limit values may not be ideal for all computing devices to which they are applied.

The fixed definition of modes and the manual setting of power limit values also cannot account for any runtime-dependent variations. For example, due to variations that may exist in the workload parameters on different computing devices, a machine learning model may inaccurately detect the mode and cause power levels that are not ideal for the actual mode to be set. As another example, even if the mode is properly detected, the fixed power limit values mapped to the properly detected mode may not be ideal when the particular computing device is operating in that mode.

Additionally, current techniques focus on the CPU workload and do not account for other components of the platform such as the GPU. Oftentimes, the performance of an application is not limited by the CPU, and therefore, increasing the power limit of the CPU will not increase the performance of the application. Instead, increasing the power limit of the CPU may lead to wasted energy and increased temperatures which may shorten the lifespan of the CPU or other platform components.

In short, although the use of machine learning has improved current schemes, these improvements are limited to the selection of a mode from among the available, predefined modes. There is no ability to customize the process of selecting a mode or to customize the fixed power limit values at runtime on a particular computing device. As a result, current schemes oftentimes fall short in their efforts to maximize performance.

BRIEF SUMMARY

The present invention extends to methods, systems, and computer program products for performing adaptive CPU power limit tuning. A mode detector can employ a machine learning model to detect a mode of operation on a computing device. As the computing device operates in the various modes, a mode boundary tuner of the mode detector can evaluate performance measurements to determine whether the currently defined boundaries between the various modes are optimal for the particular computing device. When the mode boundary tuner determines that a more optimal boundary definition exists, it can dynamically change the boundary to thereby tune the mode selection process on the particular computing device. A power limit setter may also be employed to set the CPU's power limits based on the mode detected by the mode detector. As the computing device operates in a mode, a power limit tuner can evaluate performance measurements and adjust the power limits to thereby tune the mode-specific power limits to the workload that is currently being executed.

In some embodiments, the present invention may be implemented as a method for performing adaptive CPU power limit tuning on a computing device. A machine learning model can be maintained on the computing device and can be configured to detect, from feature sets, a mode of operation of a CPU from among a plurality of modes. Performance measurements may be monitored while the CPU is operating in the plurality of modes. Based on the monitoring, it may be determined that one or more boundaries between the plurality of modes is not optimal for the computing device. In response, the one or more boundaries may be adjusted to cause the one or more boundaries to be optimal for the computing device.

In some embodiments, the present invention may be implemented as a method for performing adaptive CPU power limit tuning on a computing device. CPU power limits may be set based on a detected mode. While operating in the detected mode, performance measurements may be monitored. Based on the performance measurements, the CPU power limits may then be adjusted.

In some embodiments, the present invention is implemented as computer storage media storing computer executable instructions which when executed on a computing device implement a method for performing adaptive CPU power limit tuning. This method may include: maintaining a machine learning model that detects, from feature sets, a mode of operation of a CPU from among a plurality of modes; monitoring performance measurements while the CPU is operating in the plurality of modes; based on the monitoring, determining that one or more boundaries between the plurality of modes is not optimal for the computing device; and adjusting the one or more boundaries to cause the one or more boundaries to be optimal for the computing device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "computing device" should be construed as any computing device that includes a CPU that can have its power limits adjusted. A computing device may therefore include, but should not be limited to, those that have the various types of Intel or AMD CPUs.

Figure 2:
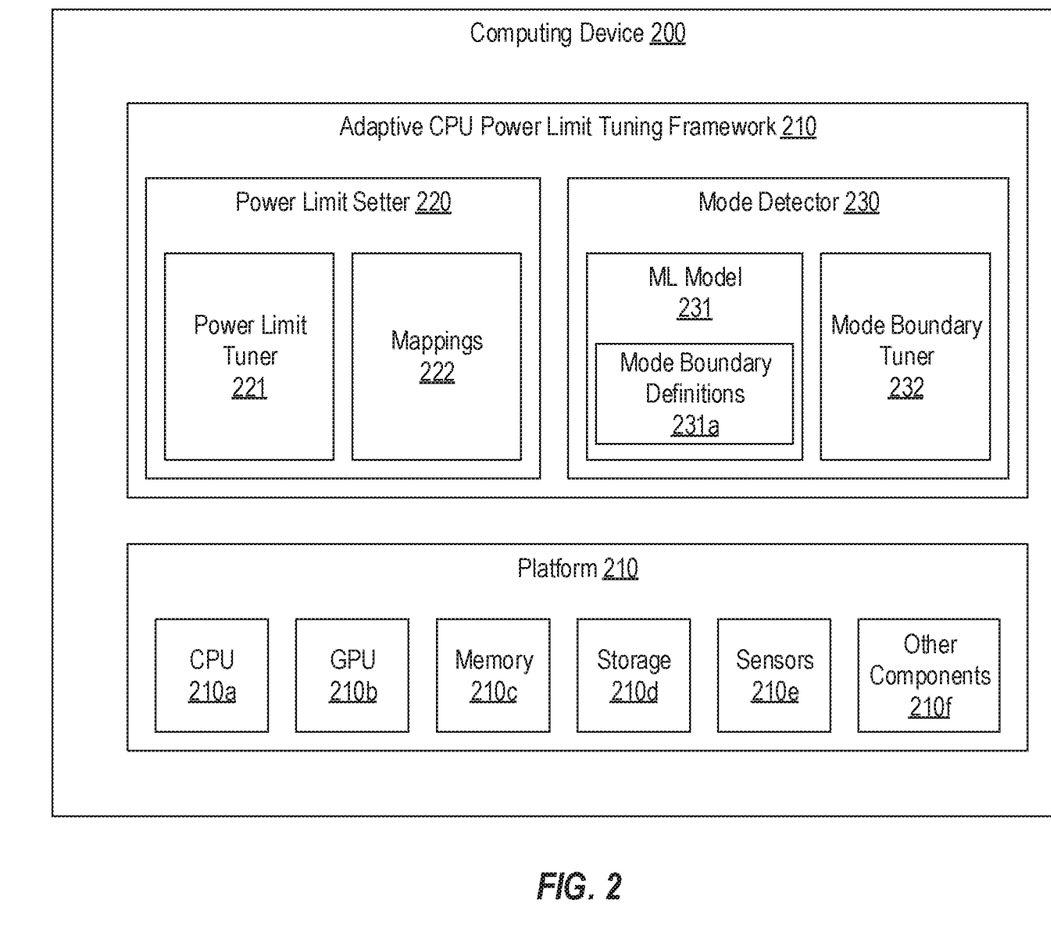
FIG. 2 illustrates an example of components that may be employed on a computing device to implement adaptive CPU power limit tuning techniques in accordance with embodiments of the present invention.

FIG. 2 provides an example of components that may be employed on a computing device 200 to implement adaptive CPU power limit tuning techniques in accordance with embodiments of the present invention. Computing device 200 includes a platform 210 that, like platform 110, is intended to generally represent the many different hardware components that may exist on computing device 200 such as, for example, a CPU 210a, a GPU 210b, memory 210c, storage 210d, sensors 210e and other components 210f.

Computing device 200 also includes an adaptive CPU power limit tuning framework 210 (or simply "framework 210") which is intended to represent any combination of software and/or hardware that may be employed on computing device 200 to perform the adaptive CPU power limit tuning functionality described herein. Framework 210 may include a power limit setter 220 and a mode detector 230. Power limit setter 220 may set CPU 210a's power limits to values defined in mappings 222 for a detected mode. Mode detector 230 may employ a machine learning (ML) model 231 that employs mode boundary definitions 231a to detect a current mode based on various features.

Mode detector 230 can also include a mode boundary tuner 232 that is configured to dynamically adjust (or "tune") mode boundary definitions 231a at runtime. Likewise, power limit setter 220 can also include a power limit tuner 221 that is configured to dynamically adjust (or "tune") the defined power limits for a particular mode while CPU 210a is operating in the particular mode. In this way, framework 210 can be leveraged to maximize the likelihood that CPU 210a's power limits will be set to values that are optimal for a currently executing application in view of the unique environment, conditions and/or requirements on a particular computing device.

Figure 3:
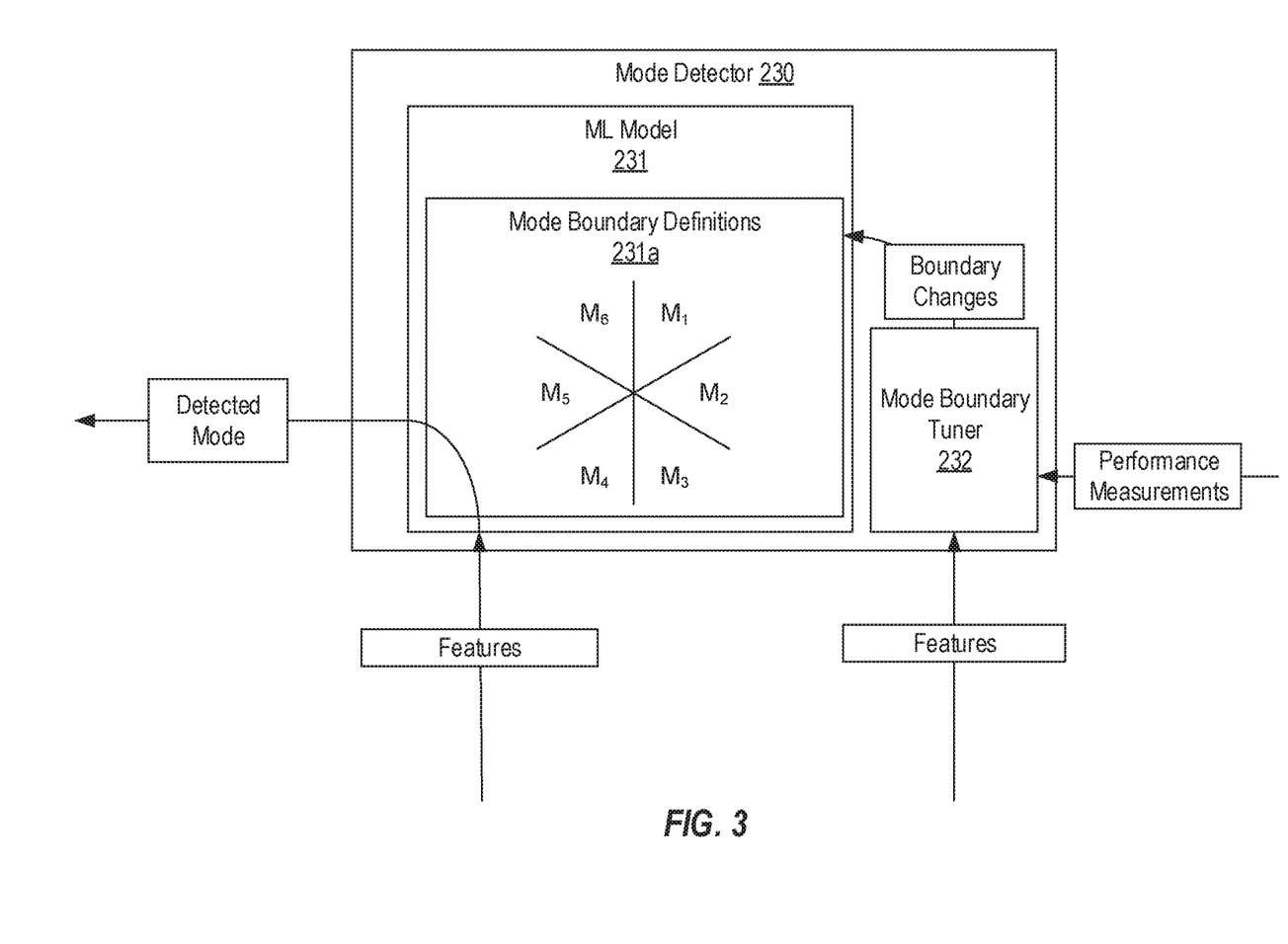
FIG. 3 provides an example of how a mode detector may be configured to tune the boundaries between modes for a particular computing device.

FIG. 3 provides an example of how mode detector 230 can operate. In this example, it is assumed that ML model 231 has been trained to predict a current mode based on a variety of features it monitors or detects on computing device 200. These features may include thermal measurements, load measurements and any other suitable feature. As represented in FIG. 3, it is assumed that mode boundary definitions 231a divide the feature space into six different modes. The choice of six modes is arbitrary and any number of modes could be employed in embodiments of the present invention.

In some embodiments, ML model 231, including mode boundary definitions 231a, may initially be defined by the platform provider and may be generalized for a family of computing devices. In other words, ML model 231 may not initially be tuned to account for any specific application performance requirements, hardware component or configuration variations that may exist on a particular computing device. FIG. 3 is intended to represent a default configuration of mode boundary definitions 231a where each mode boundary is equally spaced. Then, at runtime, mode boundary tuner 232 can monitor the features in view of performance measurements and adjust the weighting of such features to tune mode boundary definitions 231a for a particular computing device.

Figure 3A:
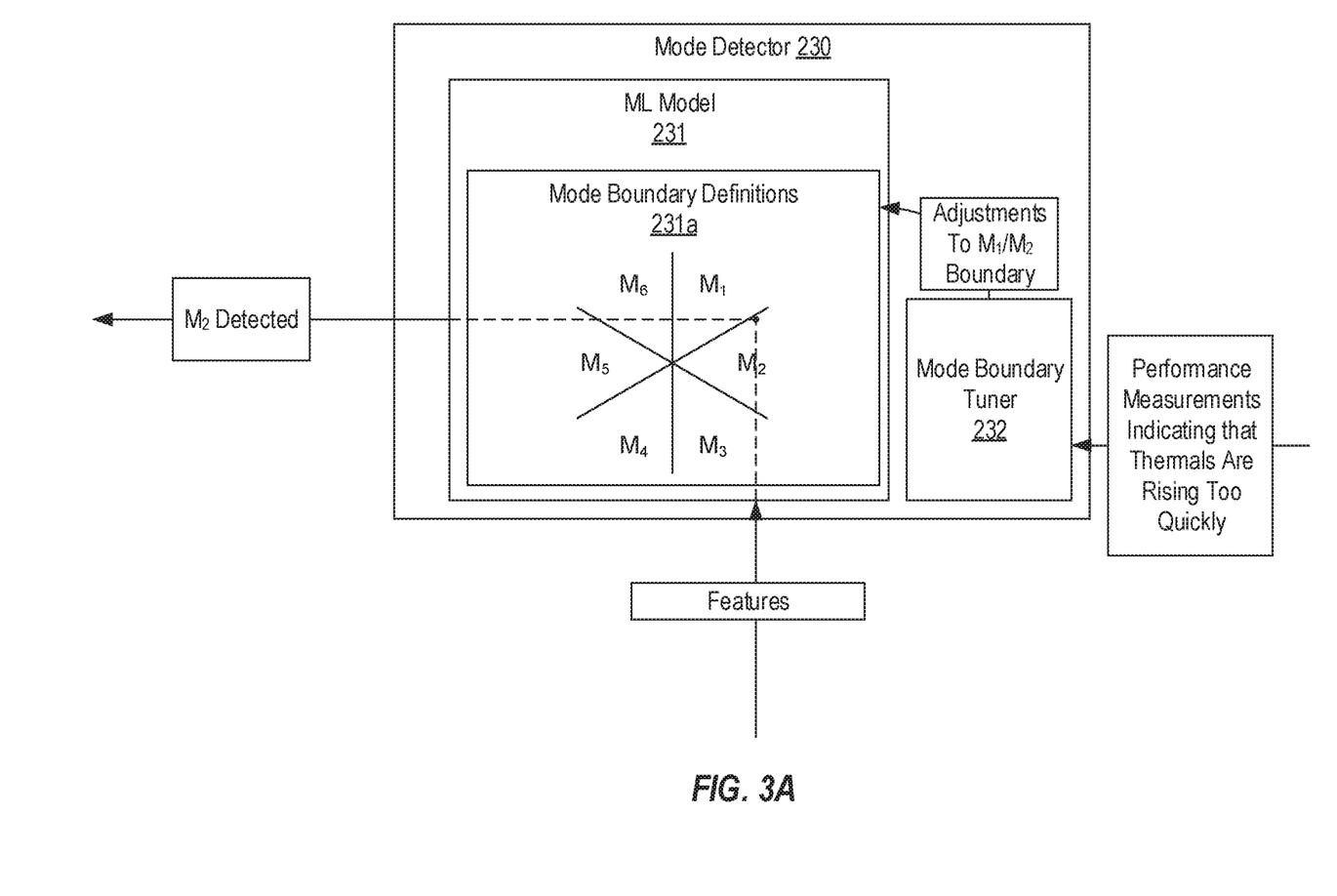
FIGS. 3A and 3B provide an example of how the boundary between two modes may be tuned.
Figure 3B:
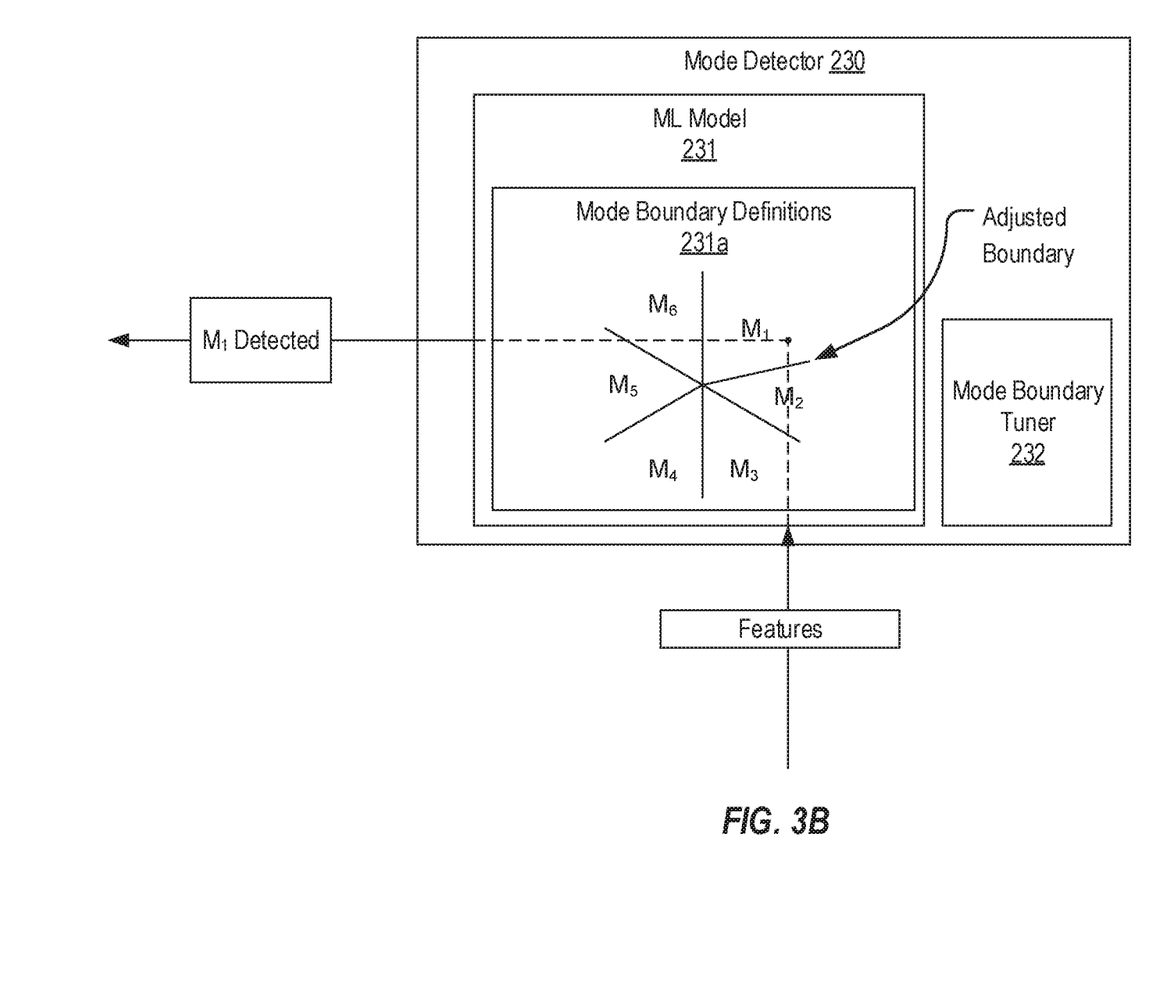

For example, FIG. 3A represents how mode boundary tuner 232 may determine that the boundary between modes $M_1$ and $M_2$ should be adjusted to account for application performance requirements, hardware component variations or configuration variations that may exist on computing device 200. In this example, it will be assumed that mode $M_2$ represents a "bursty" mode and that, while computing device 200 is operating in bursty mode, mode boundary tuner 232 receives performance measurements that indicate that thermal measurements rise too quickly when the feature set falls within the bursty mode near the $M_1/M_2$ boundary. In such a case, mode boundary tuner 232 may adjust the weights of one or more features in ML model 231 to narrow the bursty mode. As represented in FIG. 3B, this adjustment to the $M_1/M_2$ boundary will in turn cause ML model 231 to predict mode M1 rather than mode M2 in such cases. Notably, mode boundary tuner 232 makes this adjustment to mode boundary definitions 231a without adjusting the entire ML model 231 (e.g., by adjusting the weights that are applied to one or more features in ML model 231).

Mode boundary tuner 232 can evaluate a wide variety of performance measurements as part of determining whether a boundary should be adjusted. For example, performance measurements may include CPU load measurements, GPU load measurements, CPU thermal measurements, GPU thermal measurements and other load, utilization or performance measurements of CPU 210a, GPU 210b, memory 210c, storage 210d and other components 210f. In some embodiments, the performance measurements on which mode boundary tuner 232 relies in determining whether to adjust mode boundary definitions 231a may include or be a subset of the feature set that ML model 231 employs. In short, mode boundary tuner 232 may evaluate any suitable criteria in determining whether to adjust the border between any of the defined modes in ML model 231 to tune the mode selection process on a particular computing device. As some examples, mode boundary tuner 232 may adjust a boundary based on dynamic application performance requirements (e.g., changes in an application's behavior across releases), identical SKU system-to-system variations, configuration variations within the same system model (e.g., changes from the factory defaults), etc.

Figure 4:
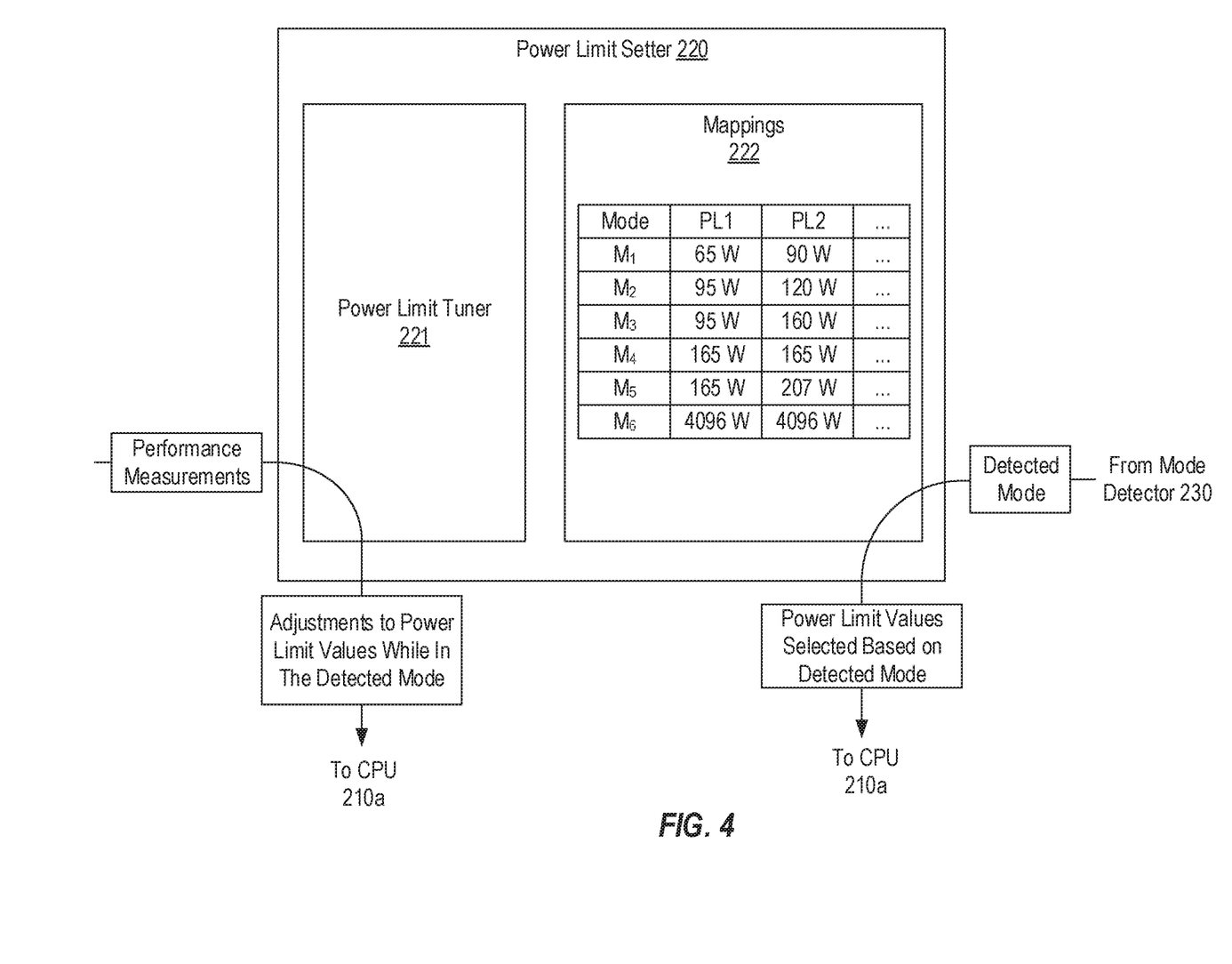
FIG. 4 provides an example of how a power limit setter can tune the power limits while operating in a particular mode.

Turning to FIG. 4, mode detector 230 can provide the detected mode to power limit setter 220 which can access mappings 222 to select the power limits that are mapped to the detected mode and cause CPU 210a to employ the power limits. For example, using the values shown in FIG. 4, if the detected mode is $M_2$, power limit setter 220 may select 95 W and 120 W from PL1 and PL2 respectively (in addition to any other power limit values that may be defined for the particular mode).

The power limits defined in mappings 222 may be considered default values for the particular mode to which they are mapped. As default values, they may not be ideal for every workload that may be applied to computing device 200. Accordingly, power limit tuner 221 can make performance measurements while computing device is operating in a particular mode and adjust the power limits to tune them for the particular workload.

Figure 5:
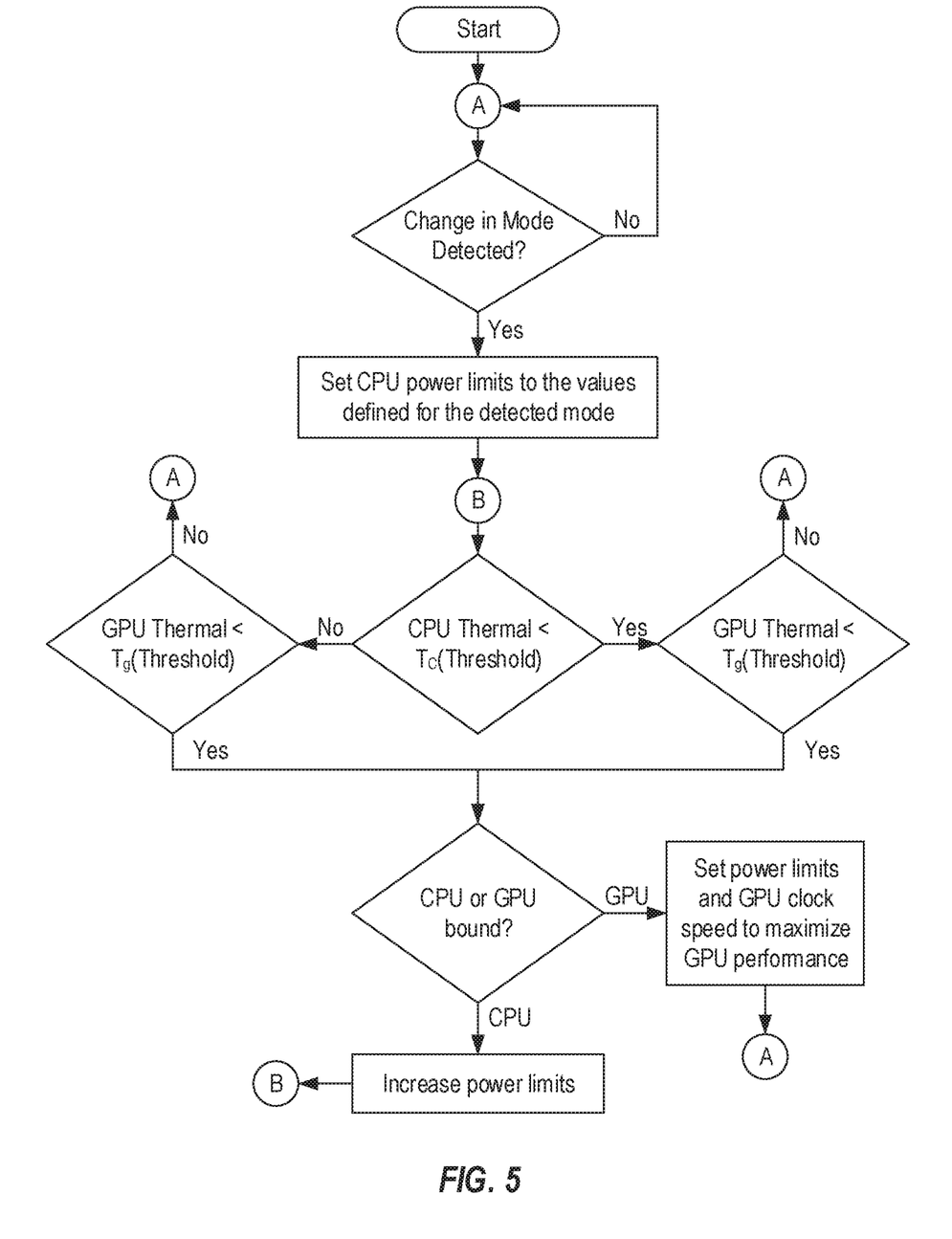
FIG. 5 provides a flow diagram of one example process by which a power limit setter may tune the power limits while operating in a particular mode.

FIG. 5 provides a flow diagram of an example process that power limit setter 220 may perform to tune CPU 210a's power limits while operating in a particular mode. The process may commence in state A in which power limit setter 220 determines whether a change in mode has been detected. When a change in mode is detected, such as when power limit setter 220 receives a predicted mode from mode detector 230, power limit setter 220 can employ mappings 222 to initially set CPU 210a's power limits.

After setting CPU 210a to the power limits defined for the currently detected mode, the process may transition to state B in which power limit tuner 221 monitors performance settings to determine if and how the power limits should be tuned. For example, power limit tuner 221 can determine whether the CPU thermal measurements are less than a defined thermal threshold ($T_c$(Threshold)). If not, power limit tuner 221 can also determine whether the thermal measurements for the GPU, which may be an integrated GPU, are less than a defined threshold ($T_g$(Threshold)). If neither the CPU thermal measurements nor the GPU thermal measurements are below the respective defined thresholds, power limit tuner 221 may determine that the current power limits are already maximized (i.e., that increasing the power limits would not be allowed due to thermal limits) and the process may return to state A to await the next detected mode change.

Similarly, if power limit tuner 221 determines that the CPU thermal measurements are less than $T_c$(Threshold) but the GPU thermal measurements exceed $T_g$(Threshold), power limit tuner 221 may determine that increasing the current power limits would cause the GPU thermal measurements to exceed $T_g$(Threshold) and may therefore forego any adjustments to the power limits and return to state A to await the next detected mode change.

On the other hand, if power limit tuner 221 determines that the CPU and GPU thermal measurements are less than $T_c$(Threshold) and $T_g$(Threshold) respectively, or that the GPU thermal measurements are less than $T_g$(Threshold) even when the CPU thermal measurements may exceed $T_c$(Threshold), power limit tuner 221 may evaluate the performance measurements to determine whether CPU 210a or GPU 210b is bound.

When power limit tuner 221 determines that GPU 210b is bound, which may represent a scenario where the workload is a video intensive application such as a multimedia application or a game, it may set CPU 210a's power limits and the GPU clock speed to maximize GPU 210b's performance and then return to state A to await the next detected mode change. The values of the power limits and GPU clock speed that maximize GPU 210b's performance may be pre-defined values that are known to maximize performance for video intensive applications.

In contrast, when power limit tuner 221 determines that CPU 210a is bound, power limit tuner 221 may increase the current power limits and return to state B to repeat the process of determining if and how the power limits should be tuned. As can be seen, this process may result in the power limits—which are initially set to default values for the particular mode—being gradually incremented while within the particular mode until thermal thresholds are reached.

In determining whether CPU 210a or GPU 210b is bound, power limit tuner 221 may employ a variety of techniques including considering a variety of performance measurements. For example, power limit tuner 221 may implement a machine learning model that employs features derived from the performance of the various components of platform 210 such as CPU utilization, CPU time of completion, GPU frames per second, GPU buffer delay, storage throughput, storage input/output operations per second (IOPS), etc.

In some embodiments, in addition to temporarily tuning the power limits while operating within a particular mode to cause them to be optimal for the particular workload, power limit tuner 221 could be configured to adjust the power limits in mappings 222, or in other words, to change the default power limits for a particular mode. For example, by performing the process represented in FIG. 5, power limit tuner 221 may learn over time that the performance of workloads that fall in a particular mode are routinely optimized when the power limits are different from what is defined in mappings 222. In such a case, power limit tuner 221 may change the power limits in mappings 222 for that mode to the learned optimal values.

In summary, an adaptive CPU power limit tuning framework can be used to tune the mode selection process to account for variations in hardware environments, to account for system-to-system variations that may exist on computing devices with the same hardware configuration, to account for variations in configurations that the end user may make, to account for variations in application requirements or to account for any other variation that may exist between different computing devices on which the machine learning model(s) of the framework were intended to be used. In addition to tuning the mode selection process, the framework can also be used to tune the power limit values while operating within a particular mode to maximize the performance of the workload that is currently being handled.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for performing adaptive CPU power limit tuning on a computing device, the method comprising:
    maintaining a machine learning model that detects, from feature sets, a mode of operation of a CPU from among a plurality of modes, each of the plurality of modes being associated with CPU power limits;
    monitoring performance measurements while the CPU is operating in the plurality of modes;
    based on the monitoring, determining that one or more boundaries between the plurality of modes is not optimal for the computing device; and
    adjusting the one or more boundaries to cause the one or more boundaries to be optimal for the computing device.

2. The method of claim 1, wherein determining that the one or more boundaries between the plurality of modes is not optimal for the computing device comprises determining that the performance measurements are not optimal when the machine learning model detects a first mode of the plurality of modes when the feature sets are near a boundary between the first mode and a second mode.

3. The method of claim 2, wherein adjusting the one or more boundaries to be optimal for the computing device comprises adjusting the boundary between the first mode and the second mode to cause the machine learning model to detect the second mode for the feature sets.

4. The method of claim 3, wherein adjusting the boundary between the first mode and the second mode comprises adjusting a weight of one or more features in the feature sets.

5. The method of claim 1, wherein the performance measurements comprise thermal measurements.

6. The method of claim 5, wherein determining that the one or more boundaries between the plurality of modes is not optimal for the computing device comprises determining that the thermal measurements increase in excess of a defined rate when the machine learning model detects a first mode of the plurality of modes when the feature sets are near a boundary between the first mode and a second mode.

7. The method of claim 5, wherein determining that the one or more boundaries between the plurality of modes is not optimal for the computing device comprises determining that the thermal measurements exceed a defined threshold when the machine learning model detects a first mode of the plurality of modes when the feature sets are near a boundary between the first mode and a second mode.

8. The method of claim 1, further comprising:
    setting the CPU power limits based on the detected mode;
    while operating in the detected mode, adjusting the CPU power limits.

9. The method of claim 8, wherein setting the CPU power limits based on the detected mode comprises setting the CPU power limits to predefined values, and wherein adjusting the CPU power limits while operating in the detected mode comprises incrementing the predefined values.

10. The method of claim 8, further comprising:
   while operating in the detected mode, determining that a GPU is bound;
   wherein adjusting the CPU power limits comprises setting the CPU power limits to optimize the GPU's performance.

11. The method of claim 8, further comprising:
   while operating in the detected mode, monitoring thermal measurements;
   wherein the CPU power limits are adjusted in response to determining that the thermal measurements do not exceed one or more defined thresholds.

12. The method of claim 11, wherein the one or more defined thresholds include a CPU thermal threshold and a GPU thermal threshold.

13. A method for performing adaptive CPU power limit tuning on a computing device, the method comprising:
   setting CPU power limits based on a detected mode;
   while operating in the detected mode, monitoring performance measurements;
   in conjunction with monitoring performance measurements, determining whether the CPU or a GPU is bound; and
   based on the performance measurements, adjusting the CPU power limits, wherein adjusting the CPU power limits comprises:
      when the CPU is bound, incrementing the CPU power limits; and
      when the GPU is bound, setting the CPU power limits to optimize the GPU.

14. The method of claim 13, wherein monitoring performance measurements comprises monitoring one or both of CPU thermal measurements or GPU thermal measurements.

15. The method of claim 13, wherein setting CPU power limits based on a detected mode comprises setting the CPU power limits to pre-defined values that are mapped to the detected mode, and wherein adjusting the CPU power limits comprises incrementing adjusting the pre-defined values while thermal measurements are below one or more defined thresholds.

16. One or more computer storage media storing computer executable instructions which when executed on a computing device implement a method for performing adaptive CPU power limit tuning, the method comprising:
   maintaining a machine learning model that detects, from feature sets, a mode of operation of a CPU from among a plurality of modes, each of the plurality of modes being associated with CPU power limits;
   monitoring performance measurements while the CPU is operating in the plurality of modes;
   based on the monitoring, determining that one or more boundaries between the plurality of modes is not optimal for the computing device; and
   adjusting the one or more boundaries to cause the one or more boundaries to be optimal for the computing device.

17. The computer storage media of claim 16, wherein adjusting the one or more boundaries to cause the one or more boundaries to be optimal for the computing device comprises changing a weighting of one or more features in the feature set.

18. The computer storage media of claim 16, wherein monitoring performance measurements comprises tracking thermal measurements.

19. The computer storage media of claim 16, wherein the method further comprises:
   setting the CPU power limits based on the detected mode;
   while operating in the detected mode, adjusting the CPU power limits.

20. The computer storage media of claim 16, wherein the performance measurements comprise thermal measurements; and
   wherein determining that the one or more boundaries between the plurality of modes is not optimal for the computing device comprises determining that the thermal measurements increase in excess of a defined rate when the machine learning model detects a first mode of the plurality of modes when the feature sets are near a boundary between the first mode and a second mode.

* * * * *